United States Patent
Richter et al.

(10) Patent No.: US 10,734,127 B2
(45) Date of Patent: Aug. 4, 2020

(54) SYSTEM AND METHOD OF PRODUCING RADIONUCLIDES IN A NUCLEAR REACTOR, INCLUDING USE OF A MAGNETIC FIELD TO RELEASE A TARGET HAVING MAGNETIC PROPERTIES FROM AN INSTRUMENTATION TUBE SYSTEM

(71) Applicant: Framatome GmbH, Erlangen (DE)

(72) Inventors: Thomas Fabian Richter, Marloffstein (DE); Alexander Sykora, Nürnberg (DE); Lothar Wistuba, Herzogenaurach (DE)

(73) Assignee: Framatome GmbH, Erlangen (DE)

( * ) Notice: Subject to any disclaimer, the term of this patent is extended or adjusted under 35 U.S.C. 154(b) by 388 days.

(21) Appl. No.: 15/568,841

(22) PCT Filed: Apr. 30, 2015

(86) PCT No.: PCT/EP2015/059525
§ 371 (c)(1),
(2) Date: Oct. 24, 2017

(87) PCT Pub. No.: WO2016/173664
PCT Pub. Date: Nov. 3, 2016

(65) Prior Publication Data
US 2018/0108445 A1    Apr. 19, 2018

(51) Int. Cl.
*G21C 19/20*    (2006.01)
*G21G 1/00*    (2006.01)
(Continued)

(52) U.S. Cl.
CPC ............. *G21G 1/001* (2013.01); *G21C 19/20* (2013.01); *G21C 19/32* (2013.01); *G21G 1/0005* (2013.01); *G21G 1/02* (2013.01)

(58) Field of Classification Search
CPC ........ G21G 1/001; G21G 1/0005; G21G 1/02; G21C 19/20; G21C 19/32
(Continued)

(56) References Cited

U.S. PATENT DOCUMENTS

| 9,208,909 B2 * | 12/2015 | Runkle | G21G 1/02 |
| 2013/0223578 A1 | 8/2013 | Russell, II et al. | |
| 2013/0315361 A1 | 11/2013 | Berger et al. | |

FOREIGN PATENT DOCUMENTS

| CA | 2792593 A2 | 6/2013 |
| EP | 1667166 A2 | 6/2006 |

(Continued)

OTHER PUBLICATIONS

PCT International Search Report and Written Opinion dated Jan. 22, 2016 from corresponding Application No. PCT/EP2015/059525, 10 pages.

*Primary Examiner* — Jack W Keith
*Assistant Examiner* — Daniel Wasil
(74) *Attorney, Agent, or Firm* — Dilworth IP, LLC (57) ABSTRACT

A method of producing radionuclides from irradiation targets in a nuclear reactor uses at least one instrumentation tube system of a commercial nuclear reactor. Irradiation targets and dummy targets are inserted into an instrumentation finger and the irradiation targets are activated by exposing them to neutron flux in the nuclear reactor core to form a radionuclide. The dummy targets hold the irradiation targets at a predetermined axial position in the reactor core corresponding to a pre-calculated neutron flux density sufficient for converting the irradiation targets to the radionuclide. Separating the dummy targets from the activated irradiation targets includes exposure to a magnetic field to retain either the dummy targets or the activated irradiation targets in the instrumentation tube system and release the other one of the activated irradiation target or the dummy (Continued)

target from the instrumentation tube system. An apparatus adapted to the above method is also provided.

28 Claims, 3 Drawing Sheets

(51) Int. Cl.
*G21G 1/02* (2006.01)
*G21C 19/32* (2006.01)
(58) Field of Classification Search
USPC .................................................. 376/189, 202
See application file for complete search history.

(56) References Cited

FOREIGN PATENT DOCUMENTS

EP 2093773 A2 8/2009
WO 2014/107218 A2 7/2014

* cited by examiner

SYSTEM AND METHOD OF PRODUCING RADIONUCLIDES IN A NUCLEAR REACTOR, INCLUDING USE OF A MAGNETIC FIELD TO RELEASE A TARGET HAVING MAGNETIC PROPERTIES FROM AN INSTRUMENTATION TUBE SYSTEM

FIELD OF THE INVENTION

The present invention is directed to a radionuclide generation system and a method of producing radionuclides from irradiation targets in a commercial nuclear reactor core.

TECHNICAL BACKGROUND OF THE INVENTION

Radionuclides are used in various fields of technology and science, as well as for medical purposes. Usually, radionuclides are produced in research reactors or cyclotrons. However, since the number of facilities for commercial production of radionuclides is limited already and expected to decrease, it is desired to provide alternative production sites.

EP 1 667 166 A2 relates to a method of producing isotopes in a light water power reactor, whereby one or more targets within the reactor may be irradiated under a neutron flux to produce one or more isotopes. The targets may be assembled into a tubing portion of a fuel rod in one or more fuel bundles that are to be loaded in a core of the reactor at a given outage. Power operations in the reactor irradiate the fuel bundles so as to generate desired isotopes, such as one or more radioisotopes at a desired specific activity or stable isotopes at a desired concentration.

The neutron flux density in the core of a commercial nuclear reactor is measured, inter alia, by introducing solid spherical probes into instrumentation tubes passing through the reactor core. It was therefore suggested that instrumentation tubes of commercial nuclear reactors shall be used for producing radionuclides.

For example, EP 2 093 773 A2 suggests that existing instrumentation tubes conventionally used for housing neutron detectors may be used to generate radionuclides during normal operation of a commercial nuclear reactor. In particular, spherical irradiation targets are linearly pushed into and removed from the instrumentation tubes. Based on the axial neutron flux profile of the reactor core, the optimum position and exposure time of the targets in the reactor core are determined. A driving gear system is used for moving and holding the irradiation targets in the instrumentation tubes.

US 2013/0315361 A1 also relates to an apparatus and methods for producing radioisotopes in multiple instrumentation tubes of operating commercial nuclear reactors. Irradiation targets are inserted and removed from multiple instrumentation tubes and converted to radioisotopes during operation of the nuclear reactor. Positioning irradiation targets are provided to properly position other irradiation targets at desired positions within or near the nuclear core. The positioning targets can be made of an inexpensive inert material or of a magnetic material, and may be held in the instrumentation tube by means of a magnetic latch. After irradiation, the targets are delivered from the instrumentation tube into a harvesting cask, and the positioning targets may be sorted out from the harvesting cask due to their markings or physical properties.

WO 2014/107218 A2 discloses a retention assembly including a restricting structure, such as a fork, for selectively blocking the movement of irradiation targets through a pathway and into/out from instrumentation tubes. Positioning targets are provided to prop up the irradiation targets. The positioning targets may be ferromagnetic. A positioning detector is used to operate the restricting fork based on the presence of magnetic members such as the positioning targets.

CA 2 792 593 A2 describes an apparatus and methods for producing radioisotopes in instrumentation tubes of operating commercial nuclear reactors. Irradiation targets are inserted and removed from instrumentation tubes during operation and converted to radioisotopes. The irradiation targets may further include a tracking target located at a known position among all other targets that is fabricated of a material that is different from all other targets and permits tracking or locating of the irradiation targets. For example, the first and last irradiation target may be fabricated of a ferromagnetic material that can be tracked with a magnet sensor, or may be fabricated of a material converting to a different isotope product that can be detected with a radiation sensor.

Conventional spherical probes for use in a ball measuring system in the core of a commercial nuclear reactor are driven into and out from the instrumentation tubes using pressurized gas. Therefore, the irradiation targets designed for use in the instrumentation tubes must be able to withstand high mechanical loads. In addition, the targets are usually produced from parent material having high isotope purity. Preparation of the irradiation targets is therefore very expensive.

However, the neutron flux density in the core of a commercial nuclear reactor is not homogeneous and may be insufficient for converting the irradiation targets to the desired radionuclide at various axial positions of the instrumentation tubes. Generally, the neutron flux density is higher in the middle section of the core than in the areas at the top or bottom thereof. In addition, spacer elements between the fuel rods may also block the neutron flux at specific axial positions in the core. Accordingly, a selective positioning of the targets is required to avoid waste of expensive parent material due to insufficient activation.

If the expensive irradiation targets are positioned in the upper or lower part of the nuclear reactor core, the parent material will not be converted completely to the desired radionuclide. The incompletely activated irradiation targets cannot be used in industrial or medical applications and therefore will have to be sorted out and disposed or stored according to their half-life until a re-use is possible. Sorting out of the incompletely activated irradiation targets will increase safety hazards and can be done in hot cells only. Moreover, the time required for separating completely converted irradiation targets from incompletely activated targets causes a depletion of the radionuclides in the converted targets due to radioactive decay. In addition, disposal of the incompletely activated irradiation targets increases the amount of nuclear waste and thus the costs of producing the desired radionuclides.

SUMMARY OF THE INVENTION

It is an object of the invention to provide a method of producing radionuclides from irradiation targets inserted into an instrumentation tube of a nuclear reactor core, such as the instrumentation tube of a ball measuring system or a Traversing Incore Probe (TIP) system of a commercial nuclear reactor which allows for an effective and economical production of radionuclides during reactor operation.

According to another object, an optimum positioning of the irradiation targets in the nuclear reactor core and a fast recovery of the activated irradiation targets from the instrumentation tubes shall be achieved to completely convert the expensive irradiation targets and avoid production of nuclear waste due to incomplete target activation.

The above objects are solved by a radionuclide generation method according to claim 1. Advantageous and expedient embodiments of the invention are indicated in the dependent claims which can be combined with each other independently.

The invention provides a method of producing radionuclides from irradiation targets in a nuclear reactor core comprising the steps of:

providing at least one instrumentation tube system including an instrumentation finger passing through a core of the nuclear reactor;

inserting at least one irradiation target and at least one dummy target into the instrumentation finger and activating the irradiation target by exposing the irradiation target to neutron flux in the nuclear reactor core to form a radionuclide;

retrieving the dummy target and the irradiation target from the instrumentation finger and separating the dummy target from the irradiation target;

wherein the dummy target and the irradiation target are arranged in the instrumentation finger in a linear order such that the dummy target holds the irradiation target at a predetermined axial position in the reactor core, said axial position corresponding to a pre-calculated neutron flux density sufficient for converting the irradiation target to the radionuclide, wherein the dummy target and the irradiation target have different magnetic properties, and wherein the step of separating the dummy target from the irradiation target includes exposing the dummy target and/or the irradiation target to a magnetic field to retain either the dummy target or the irradiation target in the instrumentation tube system and release the other one of the irradiation target or the dummy target from the instrumentation tube system.

In a further aspect, the invention provides a radionuclide generation system comprising:

an instrumentation tube system of a nuclear reactor including at least one instrumentation finger passing through a core of the nuclear reactor wherein the instrumentation tube system is configured to permit insertion and removal of irradiation targets and dummy targets into the instrumentation finger, and wherein the dummy targets and the irradiation targets have different magnetic properties;

a target drive system configured to insert the irradiation targets and dummy targets into the instrumentation finger in a predetermined linear order and to remove the irradiation targets and dummy targets from the instrumentation finger;

a core monitoring system and an instrumentation and control unit linked to each other and configured to calculate an optimum axial irradiation position and time for the irradiation targets based on the actual state of the nuclear reactor as provided by the core monitoring system;

a target removal system configured to retrieve the irradiation targets and dummy targets from the instrumentation tube system and separate the irradiation targets from the dummy targets, the target removal system including means for exposing the dummy targets and/or the irradiation targets to a magnetic field to retain either the dummy targets or the irradiation targets in the instrumentation tube system and release the other one of the irradiation targets or the dummy targets from the instrumentation tube system.

The invention contemplates that a commercial nuclear reactor whose main purpose is the generation of electrical power can be used for producing radionuclides. In particular, existing or planned ball measuring systems or other instrumentation tube systems of such commercial reactors can be modified and/or supplemented to enable an effective and efficient production of radionuclides.

According to the invention, at least some of the instrumentation tubes for example of a ball measuring system or a Transversing Incore Probe (TIP) system are used to guide the irradiation targets into the reactor core and to lead the irradiation targets out of the reactor core after complete activation of the parent material of the irradiation target. The activation of the targets is optimized by positioning the irradiation targets in predetermined areas of the reactor core having a neutron flux sufficient for converting the parent material completely into the desired radionuclide. The proper positioning of the irradiation targets is achieved by means of dummy targets made of an inert material and sequencing the dummy targets and the irradiation targets in the instrumentation tube system so as to form a column of the targets in the instrumentation finger wherein the irradiation targets are at a pre-calculated optimum axial position in the reactor core and the other positions are occupied by the inert dummy targets.

The invention further suggests separating the activated irradiation targets from the dummy targets by means of different magnetic properties, for example by using a number of magnets positioned at a discharge section of the instrumentation tube system, in order to retain one of the dummy targets or irradiation targets within the tube system and deliver the other one of the dummy targets or the irradiation targets to a storage container.

Separating the targets by means of different magnetic properties allows for a fast remote processing of the activated irradiation targets and may also avoid the use of additional mechanical systems such as counters, indexers and gateways to determine the exact position of the dummy targets and irradiation targets.

The dummy targets can be made of inexpensive inert materials and can be re-used after a short decay time so that the amount of radioactive waste is further reduced.

Accordingly, the optimum positioning of the irradiation targets by means of inexpensive dummy targets in an instrumentation tube system of a commercial nuclear reactor in combination with separating the activated irradiation targets from the dummy targets due to different magnetic properties provides an effective and economical production of radionuclides during reactor operation, and also avoids production of nuclear waste due to incomplete target activation.

According to a preferred embodiment, the instrumentation tube system is derived from a conventional ball measuring system of a pressurized water reactor, such as an EPR™ or Siemens™ PWR nuclear reactor.

As it is known to a person skilled in the art, the main purpose of a ball measuring system is to measure the neutron flux density in the core of the nuclear reactor. The ball measuring system comprises an instrumentation tube system and includes a pneumatically operated drive system configured to insert spherical probes, so called "aeroballs", into the instrumentation finger of the tube system, which pass through the reactor core over the entire axial length of the core, and to remove the aeroballs from the instrumentation finger after activation of the probes and guide the probes through the instrumentation tube system to a detection room thereby preserving the linear order of the probes.

The person skilled in the art will however recognize that the invention is not limited to use of a ball measuring system of a PWR reactor. Rather, it is also possible to use the instrumentation tubes of the Traversing Incore Probe (TIP) system of a boiling water reactor (BWR) or the view ports of a CANDU reactor.

According to the invention, the dummy targets and the irradiation targets have different magnetic properties. Preferably, either the dummy targets or the irradiation targets are magnetically attractable. More preferably, the dummy targets are made from a ferromagnetic material such as ferrite, iron or iron alloys, including ferritic stainless steel.

Most preferably, the irradiation targets and the dummy targets have a round shape, preferably a spherical shape, so that the targets are rollable and can easily be processed in the instrumentation tube system using pressurized gas such as air or nitrogen.

The irradiation targets and the dummy targets are inserted into the instrumentation finger of the instrumentation tube system in the core of the nuclear reactor. Preferably, the instrumentation tube system comprises a discharge tube which is connected to the instrumentation finger and which is located outside the nuclear reactor core. More preferably, the discharge tube has an outlet coupled to a storage container for receiving one of the irradiation targets or dummy targets removed from the instrumentation tube system through the discharge tube.

The target drive system is configured to insert the irradiation targets and dummy targets through the instrumentation tube system into the instrumentation finger in a predetermined linear order and to remove the irradiation targets and dummy targets from the instrumentation finger.

According to a preferred embodiment, the target drive system is pneumatically operated allowing for a fast processing of the irradiation targets and the dummy targets using pressurized gas such as nitrogen or air.

More preferably, the target drive system comprises one or more pneumatically operated valve batteries for separate control of the insertion and transport of the irradiation targets and dummy targets in the instrumentation tube system. Based on this separation of controls, the regular ball measuring system for determining the neutron flux in the core and the radionuclide generation system according to the invention can be driven separately. The instrumentation and control system is configured such that operation of the valves of the target drive system is at least partly automated to achieve a safe and reliable operation of the target drive system.

The target drive system may further comprise a gate device for discharging the irradiation targets and/or the dummy targets into a storage container.

According to a preferred embodiment of the invention, the target drive system comprises sensors for monitoring the presence and runtime of the irradiation targets and the dummy targets passing through the instrumentation tube system, in particular in and out of the instrumentation finger.

More preferably, the sensors of the target drive system are responsive to a variation of the magnetic flux as the irradiation targets and/or the dummy targets pass by the sensors. In addition, or as an alternative, activity sensors sensing the radiation of the irradiation targets and/or the dummy targets may be used.

According to a preferred embodiment, the core monitoring system to and the instrumentation and control unit are configured such that the irradiation process for converting the irradiation target to the radionuclide is optimized by considering the actual state of the reactor, especially the current neutron flux, fuel burn-up, reactor power and/or loading. Thus, an optimum axial irradiation position and irradiation time can be calculated for optimum results. It is however not important whether the actual calculation is performed in the instrumentation and control unit or by the adapted core monitoring system of the ball measuring system. Accordingly, both alternatives are subject of the invention.

Preferably, the information provided by the core monitoring system to the instrumentation and control unit includes at least one of the following: neutron flux (from ex- or in-core detectors), activation values from an existing ball measuring system, burn-up, reactor power, loading, rod position(s), flow rate, inlet-temperature, pressure, and time synchronization. The more information about the reactor is considered as input data, the more accurate will be the results of the calculation of the optimum axial irradiation position and irradiation time. The before mentioned parameters may include real-time values and any derivatives, like developments over time.

The instrumentation and control unit may be advantageously configured to automatically control the pressure in the instrumentation tube system, in particular after each insertion of irradiation targets and/or dummy targets by the target drive system.

The target removal system preferably includes at least one magnet, more preferably at least one magnet selected from at least one of a permanent magnet or a solenoid, arranged at the instrumentation tube system as a means to expose the targets to a magnetic field.

According to a preferred embodiment, the instrumentation tube system comprises the discharge tube connected to the instrumentation finger, and the magnet or solenoid is arranged at the discharge tube. Most preferably, the at least on magnet is movable along a longitudinal axis of the discharge tube.

Still more preferably, the target removal system comprises a magnetic lock arranged at the discharge tube for blocking flow of the irradiation targets and/or dummy targets out of the discharge tube into a storage container. Preferably, the magnetic lock is arranged proximate the outlet of the discharge tube, downstream of the at least one magnet with respect to the flow direction of the irradiation targets out of the discharge tube. More preferably, the magnetic lock comprises a retainer means such as a pin crossing the discharge tube so that the targets are retained in the discharge tube until the at least one magnet is activated.

Most preferably, the at least one magnet and/or the magnetic lock are remotely controlled by the instrumentation and control unit so that an automatic and fast processing of the irradiation targets is achieved.

In the method of the present invention, the irradiation targets are preferably positioned in the center section of the instrumentation finger in the nuclear reactor core, and the dummy targets are preferably positioned in at least one end section of the instrumentation finger, i. e., in the upper and/or lower part of the reactor core where the neutron flux density is insufficient for completely activating the irradiation targets.

The exact position of the irradiation targets in the instrumentation finger is determined by the core monitoring system and/or instrumentation and control unit. As a general rule, the center section of the instrumentation finger useful for radionuclide generation extends over about 3-4 meters, and the end portions extend over 0.5 to 1 meter in a commercial pressurized water reactor. These values may vary according to the reactor type and the actual operation status of the reactor, and will be different for boiling water reactors and CANDU reactors, respectively.

In a preferred embodiment, the instrumentation tube system penetrates the pressure vessel cover of the nuclear reactor, and the irradiation targets and dummy targets are inserted into the instrumentation finger from the top of the reactor core through the pressure vessel cover. Preferably, the dummy targets are arranged at the lower end section of the instrumentation fingers, and the irradiation targets are arranged above the dummy targets. Most preferably, the space above the irradiation targets will remain empty.

According to another embodiment, the irradiation targets in the instrumentation finger may be separated by one or more dummy targets thereby defining irradiation target subsections. The irradiation targets in the irradiation target subsections preferably have the same or different material properties. More preferably, the irradiation targets in adjacent subsections differ with respect to the parent material used as a precursor for radionuclide generation. Thus, it is possible to produce different radionuclides in a one-step operation.

Alternatively, it is also possible to insert the irradiation targets and dummy targets to the instrumentation finger from a drywell at the bottom of the reactor core, for example if the TIP system of a boiling water reactor is used as the instrumentation tube system. In this case, additional means for retaining the irradiation targets and dummy targets in the instrumentation finger are provided.

The irradiation targets are activated in the instrumentation finger for a period of time sufficient for complete conversion of the parent material of the irradiation targets to the desired radionuclide, as determined by the online core monitoring system and instrumentation and control system. The time to achieve complete conversion of the parent material will depend on the reactor type and status, neutron flux conditions, type of parent material and various other parameters known to a person skilled in the art, and may range from several hours to days, preferably 1 to 10 days. Complete conversion means a conversion rate of the parent material providing a radionuclide content suitable for medical or industrial application of the irradiation targets.

After activation, the irradiation targets and dummy targets are preferably transferred out of the instrumentation fingers into the discharge tube, more preferably using pressurized gas, by preserving the linear order of the dummy targets and the irradiation targets. The discharge tube is blocked by the magnetic lock so as to prevent the irradiation targets and dummy targets from leaving the instrumentation tube system.

For separating the irradiation targets from the dummy targets and selectively removing the irradiation targets from the instrumentation tube system, the irradiation targets and the dummy targets are exposed to a magnet field, preferably by remotely activating the one or more magnets arranged at the discharge tube adjacent the magnetic targets.

The magnetic lock is then opened, and the non-magnetic targets, preferably non-magnetic irradiation targets, are released from the discharge tube under the action of gravity and passed into a storage container whereas the magnetic dummy targets are retained in the discharge tube by the action of the magnetic field.

In a further embodiment, if one ore more magnetic targets, such as the dummy targets, are positioned ahead of the non-magnetic targets, such as the irradiation targets, proximate an outlet of the discharge tube, pressurized gas is used to drive the non-magnetic irradiation targets back into the instrumentation finger or a holding section in the instrumentation tube system while the magnetic dummy targets are retained in the discharge tube by means of the activated magnetic field. The magnetic lock can then be opened and the dummy targets be released from the discharge tube by switching off the magnetic field.

The method of the invention will also be applicable vice-versa if the dummy targets are non-magnetic and the irradiation targets are ferromagnetic.

The invention thus provides a fast and effective method to completely activate the irradiation targets in the instrumentation fingers during normal reactor operation, and separating the activated irradiation targets from inert dummy targets by means of their different magnetic properties.

BRIEF DESCRIPTION OF THE DRAWINGS

Further features and advantages of the invention will become more apparent from the following description of preferred embodiments and from the accompanying drawings wherein like elements are represented by like numerals. The preferred embodiments are given by way of illustration only and are not intended to limit the scope of the invention which is apparent from the attached claims.

In the drawings.

DETAILED DESCRIPTION OF PREFERRED EMBODIMENTS

Figure 1:
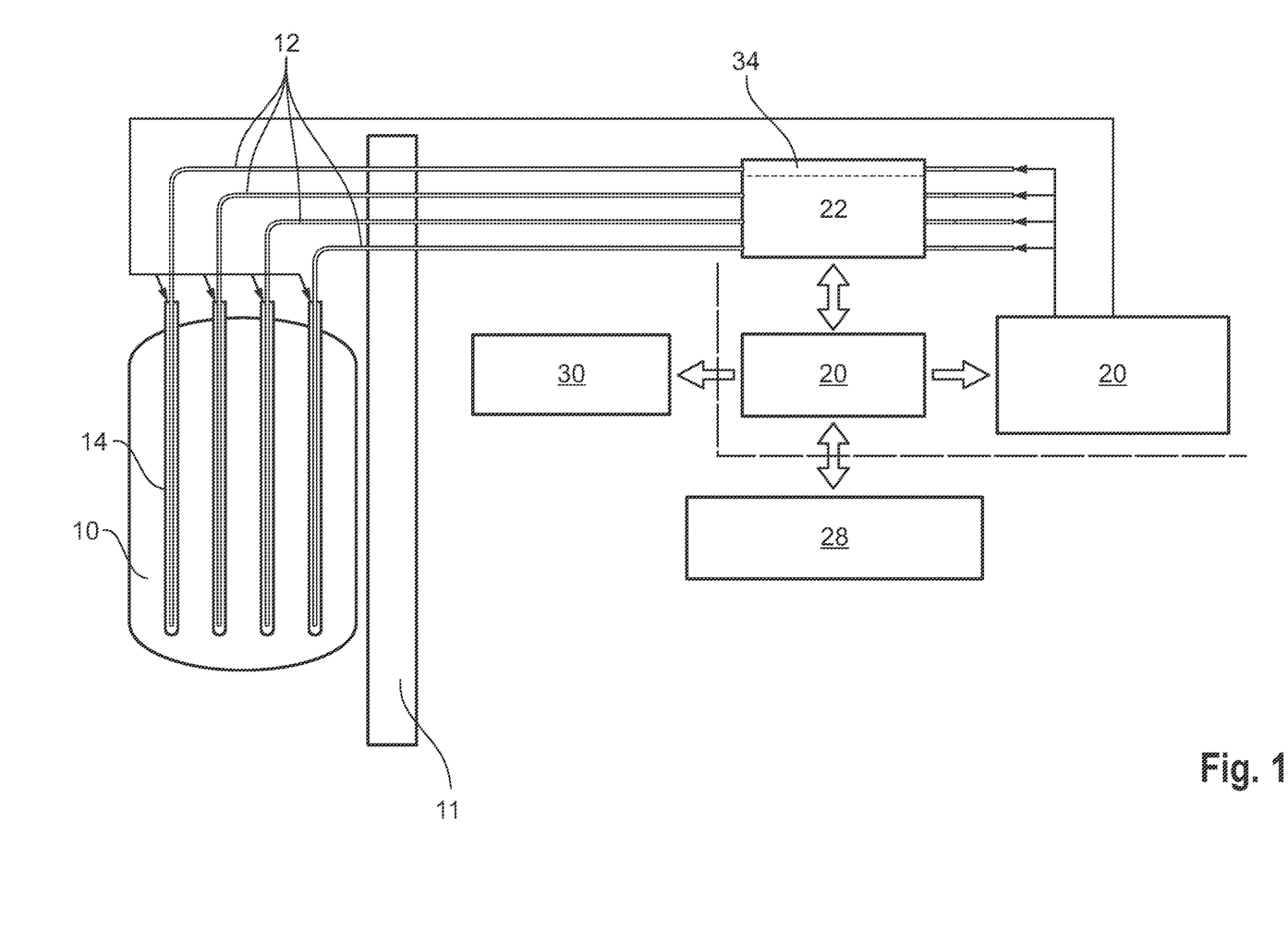
FIG. 1 shows a schematic sketch of a radionuclide generation system (MAS) setup according to the invention.

FIG. 1 illustrates the basic setup of a radionuclide generation system within a commercial nuclear power plant, in particular a power plant with an EPR™ or Siemens DWR nuclear reactor.

As opposed to a research reactor, the purpose of a commercial nuclear reactor is the production of electrical power. Commercial nuclear reactors typically have a power rating of 100+ Megawatt electric.

The basis of the radionuclide generation system described in the example embodiments is derived from a commercial ball measuring system, the main purpose of which is to measure the neutron flux density in the core of the nuclear reactor using a plurality of spherical probes, so called aeroballs, arranged in a linear order thereby forming an aero ball column. The ball measuring system includes a pneumatically operated drive system configured to insert the aeroballs into an instrumentation finger extending into and passing the core through its entire axial length, and to remove the aeroballs from the instrumentation finger after activation.

For easier reference, hereafter the radionuclide generation system based on a commercial ball measuring system will be also referred to as MAS (Medical Aeroball System).

In the following, the major components of the MAS, which are provided in addition to those of the commercial ball measurement system, or which are supplemented or modified, will be further described.

FIG. 1 shows a commercial nuclear reactor comprising an instrumentation tube system 12 including at least one instrumentation finger 14 passing through a core 10 of the nuclear reactor. The instrumentation tube system 12 is configured to permit insertion and removal of irradiation targets 16 and dummy targets 18 (cf. FIG. 3) into the instrumentation finger 14.

According to the present invention, the commercial ball measuring system of the pressurized water reactor is adapted to also handle irradiation targets 16 and dummy targets 18 having a round or spherical shape and having a diameter corresponding to the clearance of the instrumentation finger of the ball measuring system. Preferably, the diameter of the targets 16, 18 is in the range of between 1 to 3 mm, preferably about 1.7 mm.

The instrumentation tube system 12 penetrates a reactor confinement 11 and the pressure vessel cover of the nuclear reactor, with the instrumentation finger 14 extending from the top to the bottom of the reactor core 10 over substantially the entire axial length of the reactor core 10. An end of the instrumentation finger 14 at the bottom of the reactor core 10 is closed and/or provided with a stop so that the irradiation targets 16 and dummy targets 18 inserted into the instrumentation finger form a column wherein each target 16, 18 is at a predefined axial position.

A separation component (not shown) may be provided for splitting the tubes of the instrumentation tube system 12 at a cable bridge above the reactor pressure vessel cover, via which the tubes are led out of the reactor confinement 11, and/or at a connector board.

Preferably, several humidity sensors are provided in the instrumentation tube system 12 to detect any ingress of primary coolant (or any other liquid) into the MAS. It is understood that the instrumentation fingers 14 used for the MAS are in direct contact with the primary cooling water surrounding the core of the nuclear reactor. The humidity sensors may be based on spark plugs which are modified for measuring electrical resistance.

Further sensors are preferably provided for monitoring the presence and runtime of the targets 16, 18 passing through the instrumentation tube system. These sensors are preferably arranged at the tubes penetrating the reactor core 10. The measuring principle may be based on the detection of a variation of the magnetic flux as the irradiation targets 16 and/or the dummy targets 18 pass by the sensors for measuring transport time and completeness indication. Preferably, the sensors are used to monitor that all irradiation targets 16 have left the instrumentation finger 14 during the removal process while the targets pass the sensors. In addition, or as an alternative, activity sensors sensing the radiation of the irradiation targets 16 and/or the dummy targets 18 may be used.

The instrumentation tube system 12 further comprises a discharge tube 34 which is connected to the instrumentation finger 14 and which is located outside the nuclear reactor core 10. The irradiation targets 16 or dummy targets 18 are removed from the instrumentation tube system 12 through the discharge tube 34.

The instrumentation tube system 12 is connected to a target drive system 20 configured to insert the irradiation targets 16 and dummy targets 18 into the instrumentation finger 14 in a predetermined linear order and to drive the irradiation targets 16 and dummy targets 18 out of the instrumentation finger 14.

Preferably, the target drive system 20 is pneumatically operated allowing for a fast processing of the irradiation targets 16 and the dummy targets 18 using pressurized gas such as nitrogen or air.

Preferably, the target drive system 20 comprises a valve battery (not shown) which is used as an additional pneumatic system for separate control of the targets 16, 18 in the irradiation tube system 12. The valve battery may be implemented as a further subsystem in addition to the valve batteries of the conventional ball measuring system, or a separate target drive system is installed.

Figure 4:
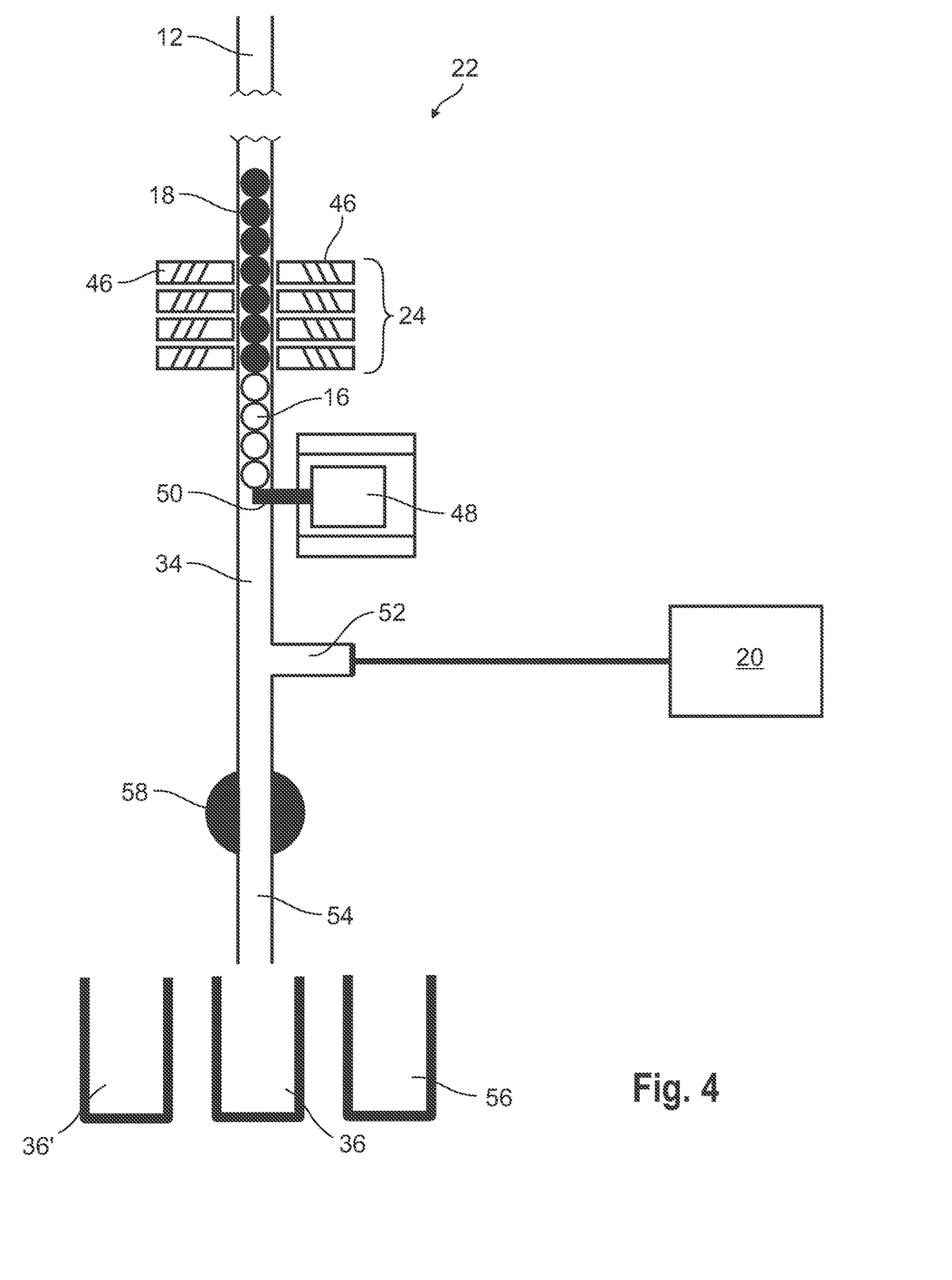
FIG. 4 shows a schematic sketch of a removal system and discharge tube of the present invention.

The target drive system 20 preferably comprises a target filling device (not shown) for inserting the targets 16, 18 into the instrumentation finger 14. A gate system (not shown) including several (electro)-mechanical devices may be used to fill the irradiation targets 16 and dummy targets 18 into the instrumentation tube system 12 for transport to the reactor core 10 and also guide the targets 16, 18 to the discharge tube 34 and the storage containers 36 (FIG. 4).

The target drive system 20 cooperates with a target removal system 22 configured to retrieve the irradiation targets 16 and dummy targets 18 from the instrumentation tube system 12 and separate the irradiation targets 16 from the dummy targets 18. In particular, the target removal system 22 includes means 24 for exposing the dummy targets 18 and/or the irradiation targets 16 to a magnetic field to retain either the dummy targets 18 or the irradiation targets 16 in the instrumentation tube system 12 and release the other one of the irradiation targets 16 or the dummy targets 18 from the instrumentation tube system 12 (cf. FIG. 4).

An instrumentation and control unit (ICU) 26 is linked to the target drive system 20 and the target removal system 22 as well as an online core monitoring system 28 for controlling activation of the irradiation targets 16, and a fault monitoring system 30. The ICU 26 and/or the online core monitoring system 28 are configured to calculate an optimum axial irradiation position and time for the irradiation targets 16 based on the actual state of the nuclear reactor as provided by the online core monitoring system 28.

The ICU 26 is connected via an interface with the adapted online core monitoring system 28 software. The ICU 26 is further connected to the mechanical components of the MAS, including the sensors. For an efficient generation of radionuclides, optimum irradiation conditions and time for the irradiation targets are determined. Practically all relevant input data for this calculation are available from the online core monitoring system 28 of the conventional ball measuring system, for example the POWERTRAX/S™ core monitoring software system available from Areva.

The ICU 26, which is linked to the core monitoring system 28 can calculate the optimum irradiation time and axial irradiation position, as well as further parameters, like the amount of irradiation targets 16 in an instrumentation finger 14 defining the actual length of the respective target column and the positions of the individual irradiation targets 16 and dummy targets 18 within the target column. Based on the results of these calculations the ICU 26 and/or an operator operate the mechanical MAS components accordingly. The ICU 26 is also connected to an updated fault monitoring system 30 of the ball measuring system for reporting any errors in the MAS.

The online calculation of the optimum irradiation time and axial irradiation position of the irradiation targets is not simply based on the assumption of an estimated constant neutron flux, but rather takes the actual state of the reactor into account, especially at least one of the following parameters: neutron flux, activation values from an existing ball measuring system, burn-up, reactor power, loading, rod position(s), flow rate, inlet-temperature, pressure, and time synchronization. Not only real-time values of these parameters, but also their development over time may be considered.

Figure 2:
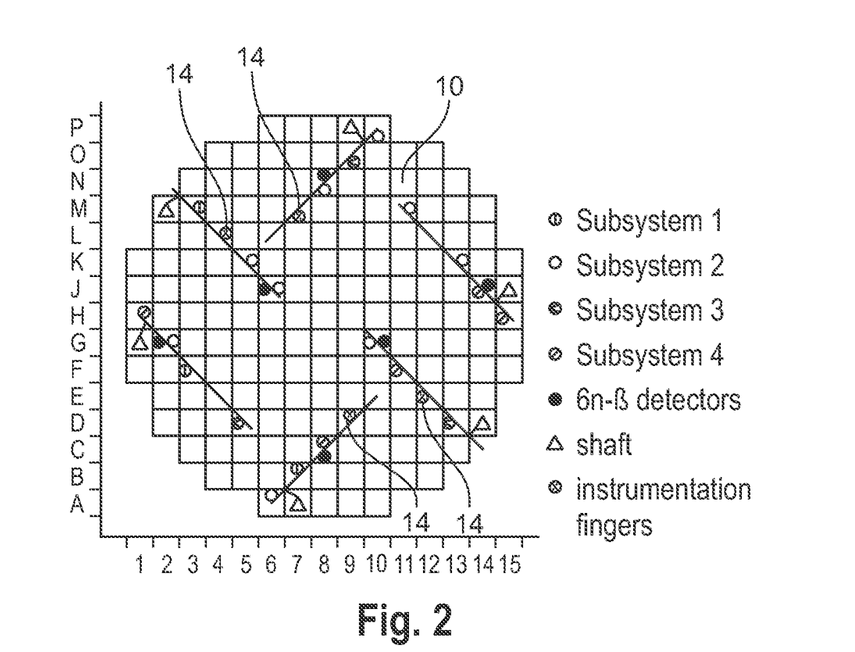
FIG. 2 shows a schematic diagram providing information on the amount of instrumentation fingers, their equipment with ball measuring detectors and their distribution within the core of the nuclear reactor.

FIG. 2 schematically depicts a diagram providing information on the equipment of the reactor core 10 with MAS instrumentation fingers 14, conventional ball measuring and neutron detector subsystems and their distribution within the core 10 of the nuclear reactor. According to the example shown in FIG. 2, four positions are taken from the conventional ball measuring and neutron detector systems for use in the MAS.

Figure 3:
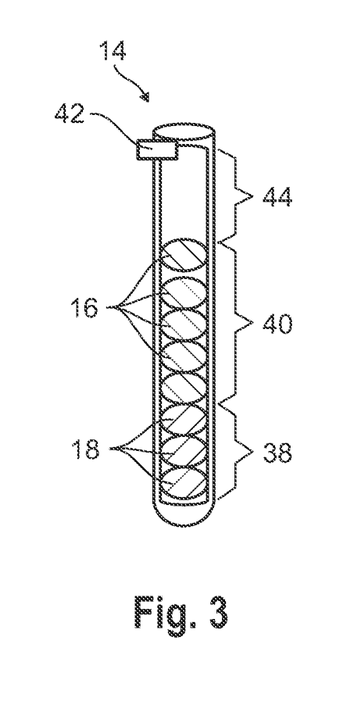
FIG. 3 shows an instrumentation finger filled partly with irradiation targets and partly with dummy targets.

FIG. 3 shows a simplified illustration of an instrumentation finger 14 which is used for the MAS. As described above, the instrumentation finger 14 extends from the top to the bottom of the reactor core 10 over substantially the entire axial length of the reactor core 10. The irradiation targets 16 and dummy targets 18 are inserted into the instrumentation finger in a linear order to form a column wherein each target 16, 18 is at a predefined axial position.

With the aid of the online core monitoring system 28 it is possible to determine sections 38, 44 of the instrumentation finger 14 in which the neutron flux is too low for producing radionuclides, and sections 40 where the neutron flux is above the required irradiation target demand and thus suitable for producing the desired radionuclides.

A humidity sensor 42 is arranged at the instrumentation finger 10. Alternatively or in addition, humidity sensors can be arranged at components of the instrumentation tube system 12 outside the reactor pressure vessel.

In order to eliminate any waste of expensive irradiation targets 16, dummy targets 18 are provided and positioned in the lower end section 38 of the irradiation finger 14 having a too low neutron flux density for radionuclide generation. The dummy targets 18 are made of an inert material which is not substantially activated under the conditions in the core 10 of an operating nuclear reactor.

The irradiation targets 16 comprise a suitable parent material for generating radionuclides which are to be used for medical and/or other purposes. More preferably, the irradiation targets consist of the parent material which converts to a desired radionuclide upon activating by exposure to neutron flux present in the core of an operating commercial nuclear reactor. Useful parent materials are Mo98 and Yb176 which are converted to Mo99 and Lu177, respectively. It is understood, however, that the invention is not limited to the use of a specific parent material.

As shown in FIG. 3, the irradiation targets 16 are positioned above and are held in place by the dummy targets 18 in the sections 40 of the irradiation finger 14 where the neutron flux is sufficient to completely convert the irradiation targets into the desired radionuclides, as determined by the ICU 26 and/or the online core monitoring system 28.

In accordance with a preferred embodiment of the invention, an upper section 44 of the instrumentation finger 14 is kept empty.

In a further embodiment (not shown), one or more of the irradiation targets 16 in the instrumentation finger 14 may be separated from each other by one or more dummy targets 18 thereby defining irradiation target subsections. The irradiation targets in the irradiation target subsections preferably have the same or different material properties. More preferably, the irradiation targets in adjacent subsections differ with respect to the parent material used as a precursor for radionuclide generation.

According to the invention, the dummy targets 18 and the irradiation targets 16 have different magnetic properties. Preferably, either the dummy targets or the irradiation targets are magnetically attractable. More preferably, the dummy targets 18 are made from a ferromagnetic material such as iron or iron alloys, including ferritic stainless steel, or ferrite.

For use in a conventional ball measuring system, the irradiation targets 16 and the dummy targets 18 have a round shape, preferably a spherical shape, so that the targets are rollable and can easily be processed in the instrumentation tubes of the ball measuring system by pressurized air and/or gravity.

The target removal system 22 is schematically shown in FIG. 4. The means 24 for exposing the irradiation targets 16 and/or dummy targets 18 to a magnetic field preferably include one or more permanent magnets or solenoids 46 associated to the irradiation tube system 12.

A discharge tube 34 is connected to the instrumentation finger 14 through the instrumentation tube system 12 (FIG. 1) and is configured to receive the irradiation targets 16 and dummy targets 18 driven out of the instrumentation finger after activation is completed. The discharge tube 34 is located outside the reactor core 10. One or more solenoids 46 are surrounding the discharge tube 34. Preferably, the solenoids 46 are movably arranged along a longitudinal axis of the discharge tube 34.

The discharge tube 34 is further provided with a magnetic lock 48 for blocking flow of the irradiation targets 16 and/or dummy targets 18 out of the discharge tube. In the embodiment shown in FIG. 4, the magnetic lock 48 comprises a pin 50 crossing the discharge tube 34 so that the targets 16, 18 are retained in the discharge tube 34 until the electromagnetic coils 46 are activated.

The one or more magnets or solenoids 46 and/or the magnetic lock 48 are remotely controlled by the ICU 26 so that an automatic and fast processing of the irradiation targets 16 and the dummy targets 18 is achieved.

The discharge tube 34 further comprises a gas inlet 52 linked to the target drive system 20 to blow pressurized gas such as air or nitrogen into the instrumentation tube system 12 and drive the irradiation targets 16 and dummy targets 18 out of the instrumentation finger 14 into the discharge tube 34.

In addition, the discharge tube 35 comprises an outlet 54 coupled to one or more storage containers 36, 36' and/or an intermediate storage tank 56 to selectively receive the irradiation targets 16 or dummy targets 18 released from the discharge tube 34. The storage containers 36, 36' and or the intermediate storage tank 56 may be movable to match with the outlet 54. Alternatively, the outlet may include a gate 58 to selectively direct the irradiation targets 16 or dummy targets 18 to the appropriate container 36, 36' and tank 56.

For operating the radionuclide generation system or MAS of the present invention, the irradiation targets 16 and the dummy targets 18 are inserted into the instrumentation finger 14 using the target drive system 20, and the irradiation targets 16 are activated by exposure to neutron flux in the nuclear reactor core when in power generating operation to form a radionuclide.

Preferably, the dummy targets 18 are made of a ferromagnetic material, and the irradiation targets 16 are substantially non-magnetic or paramagnetic.

The dummy targets 18 and the irradiation targets 16 are arranged in the instrumentation finger 14 in a pre-calculated linear order such that the dummy targets 18 hold the irradiation targets 16 at a predetermined axial position in the reactor core. The optimum axial position of the irradiation targets 16 is calculated by the ICU 26 and/or the online core monitoring system 28 and corresponds to a neutron flux density sufficient for completely converting the irradiation targets 16 to the radionuclide during a predetermined period of time. The remaining positions in the instrumentation finger 14 are occupied by the dummy targets 18 which hold the irradiation targets 16 in place.

After activation of the irradiation targets 16 and conversion to the desired radionuclide, the dummy targets 18 and the activated irradiation targets 16 are retrieved from the instrumentation finger 14, and the dummy targets 18 are separated from the activated irradiation targets 16 using the target removal system 22. The dummy targets 18 and/or the activated irradiation targets 16 are exposed to a magnetic field to retain either the dummy targets 18 or the activated irradiation targets 16 in the instrumentation tube system 12 and release the other one of the activated irradiation targets 16 or the dummy targets 18 from the instrumentation tube system 12.

Operation of the MAS may is preferably monitored and controlled at an operator station via a process unit. The process unit is installed at a separate control cabinet in a control cabinet room (not shown). The process unit is equipped with a display and, inter alia, allows to control specific parameters of the MAS valve batteries.

At the operator station the state of the irradiation targets 16 during irradiation and the remaining irradiation time can be monitored. When the calculated irradiation time of a set of targets 16, 18 in an instrumentation finger 14 is reached, a message prompts the operator to start the removal process with respect to this instrumentation finger 14. The operation of the various valves of the target drive system 20 is partly automated so that repeating actions are performed more safely and more reliably.

After each insertion of irradiation targets 16 and dummy targets 18 into the instrumentation tube system 12, the pressure in the tube system is checked and regulated in a fully automated manner. The ICU 26 also collects further digital signals representative of certain system conditions. Especially, the signals of the humidity sensors allow a leakage monitoring, i. e. to detect whether any primary coolant has entered the tube system of the MAS.

The electric power for the MAS components, including the valve batteries and the process unit of the MAS cabinet, is provided by a load cabinet of the ball measuring system. To this end, a further power inverter with appropriate fuses is installed in the load cabinet. It is also possible to use an additional 24 volt supply incorporated in the control cabinet room.

The irradiation targets 16 are preferably positioned in the center section 40 of the instrumentation finger 14 in the reactor core 10, and the dummy targets 18 are preferably positioned in the end section 38 and/or the upper section 44 of the instrumentation finger 14, i. e., in the upper and/or lower part of the reactor core 10 where the neutron flux density is insufficient for completely activating the irradiation targets 16 (cf. FIG. 3).

The exact position of the irradiation targets 16 in instrumentation finger 14 is pre-calculated by the ICU 26 and/or the online core monitoring system 28.

The irradiation targets 16 and dummy targets 18 are preferably inserted into the instrumentation finger 14 from the top of the reactor core 10 through the pressure vessel cover. Preferably, the dummy targets 18 are arranged at the lower portion of the instrumentation finger 14, and the irradiation targets 16 are arranged above the dummy targets 18. As shown in FIG. 3, the space above the irradiation targets 16 in the upper section 44 can remain empty.

After activation is completed, the irradiation targets 16 and the dummy targets 18 are transferred out of the instrumentation finger 14 into the discharge tube 34 using pressurized gas such as nitrogen or air provided by the target drive system 20 (cf. FIG. 4). The linear order of the dummy targets 18 and the irradiation targets 16 in the instrumentation finger 14 is preserved in the discharge tube 34 so that the irradiation targets 16 are proximate to the outlet 54 of the discharge tube 34. The discharge tube 34 is blocked by the magnetic lock 48 providing a stop for the targets 16, 18 and to prevent the irradiation targets 16 and dummy targets 18 from leaving the tube system 12.

The valves of the drive system 20 are then closed and the pressure in the instrumentation tube system 12 is relieved.

For separating the irradiation targets 16 from the dummy targets 18 and selectively removing the irradiation targets 16 from the discharge tube 34, the irradiation targets 16 and the dummy targets 18 are exposed to a magnet field created by activating the solenoids 46 arranged at the discharge tube. More preferably, the solenoids 46 are moved along the longitudinal axis of the discharge tube 34 and arranged adjacent to the ferromagnetic dummy targets 18 so that each dummy target 18 is associated to and exposed to the magnetic field of a solenoid 46.

The magnetic lock 48 is then opened, and the non-magnetic irradiation targets 16 are released from the discharge tube 34 under the action of gravity and passed into the storage container 36 for further processing and transportation to the application site whereas the magnetic dummy targets 18 are kept in the discharge tube 34 by the action of the magnetic field generated by the solenoids 46.

The solenoids 26 arranged at the discharge tube 34 can also be used for slowing down the targets 16, 18 when driven out of the instrumentation finger 14 in order to prevent the targets from being damaged. Alternatively, it is possible to stop the targets 16, 18 in the discharge tube using the solenoids 46 only, without activating the magnetic lock 48.

After the irradiation targets 16 are separated from the dummy targets 18 and are harvested in the storage container 36, the outlet is coupled to the intermediate storage tank 56, the magnetic field is switched off and the dummy targets 18 are transferred to the intermediate storage tank 56 under the action of gravity for further use after a short decay period.

Alternatively, some or all of the dummy 18 targets can be driven back into the instrumentation finger 14 using pressurized gas from the target drive system 20, and new irradiation targets 16 be inserted into the instrumentation tube system.

According to another embodiment, the irradiation targets 16 in the instrumentation finger 14 may be separated by one or more dummy targets 18 thereby defining irradiation target subsections. The irradiation targets 16 in the irradiation target subsections can have the same or different material properties.

Also in this embodiment, the activated irradiation targets 16 and dummy targets 18 are driven out of the instrumentation finger 14 into the discharge tube 34 preserving the linear order of the dummy targets 18 and the irradiation targets 16. The discharge tube 34 is blocked by the magnetic lock 48 so as to prevent the irradiation targets and dummy targets from leaving the tube system 12.

If one or more ferromagnetic dummy targets 18 are now positioned ahead of the irradiation targets 16 proximate the outlet 54, the solenoids 46 are arranged adjacent these dummy targets 18. Pressurized gas from the target drive system 20 is used to drive the non-magnetic irradiation targets 16 back into the instrumentation finger 14 or a holding section in the instrumentation tube system 12 while the magnetic dummy targets 18 are retained in the discharge tube 34 by means of the activated magnetic field. The magnetic field is then switched off, the magnetic lock 48 is opened, and the dummy targets 18 are released from the discharge tube 34 under the action of gravity and transferred into the intermediate storage tank 56 coupled to the outlet 54.

In the next step, the magnetic lock 48 is closed and the irradiation targets 16 and the remaining dummy targets 18 are driven out of the instrumentation finger 14 or holding section using pressurized gas from the target drive system 20. The activated irradiation targets 16 are now positioned proximate the magnetic lock 48 and the discharge tube outlet 54 and can be separated from the dummy targets 18 as described above.

If necessary, the separation steps can be repeated until all irradiation targets are selectively harvested from the tube system in the respective storage containers 36, 36'.

The method of the invention will also be applicable vice-versa if the dummy targets 18 are non-magnetic and the irradiation targets 16 are ferromagnetic.

The radionuclide generation system according to the invention can also be installed in a nuclear power plant having no conventional ball measuring system. The ball measuring system as described above only provides a basis to facilitate an installation of the radionuclide generation system since no additional instrumentation tubes, fingers and the like need to be installed only for the MAS. Possible reactor types for such an application include boiling water reactors and CANDU (CANada Deuterium Uranium) reactors.

The invention claimed is:

1. A method of producing radionuclides from irradiation targets in a nuclear reactor comprising the steps of:
   providing at least one instrumentation tube system including an instrumentation finger passing through a core of the nuclear reactor;
   inserting at least one irradiation target and at least one dummy target into the instrumentation finger and activating the irradiation target to form an activated irradiation target by exposing the irradiation target to neutron flux in the nuclear reactor core to form a radionuclide;
   retrieving the dummy target and the activated irradiation target from the instrumentation finger and separating the dummy target from the activated irradiation target;
   wherein the dummy target and the irradiation target are arranged in the instrumentation finger in a linear order wherein the dummy target holds the irradiation target at a predetermined axial position in the reactor core, said axial position corresponding to a pre-calculated neutron flux density sufficient for converting the irradiation target to the radionuclide,
   wherein the dummy target and the irradiation target have different magnetic properties, and
   wherein the step of separating the dummy target from the activated irradiation target includes exposing the dummy target and/or the activated irradiation target to a magnetic field to retain either the dummy target or the activated irradiation target in the instrumentation tube system and release the other one of the activated irradiation target or the dummy target from the instrumentation tube system.

2. The method according to claim 1 wherein the instrumentation finger has a center section and an end section, and wherein the irradiation targets are positioned in the center section and the dummy targets are positioned the end section.

3. The method according to claim 2 wherein the end section of the instrumentation finger is in a bottom part of the reactor core.

4. The method according to claim 3 wherein the instrumentation finger has an upper section located above the irradiation targets, and wherein the upper section is left empty.

5. The method according to claim 1 wherein one or more irradiation targets in the instrumentation finger are separated from each other by one or more dummy targets thereby defining irradiation target subsections.

6. The method according to claim 5 wherein the irradiation targets in the irradiation target subsections are made of a different parent material.

7. The method according to claim 1 wherein the dummy targets are ferromagnetic, and the irradiation targets are non-magnetic or paramagnetic.

8. The method according to claim 1 wherein the dummy targets and irradiation targets are inserted into and retrieved from the instrumentation tube system with pressurized gas.

9. The method according to claim 1 wherein the instrumentation tube system comprises a discharge tube, and the magnetic field is generated by activating at least one magnet arranged at the discharge tube.

10. The method according to claim 9 wherein the dummy targets and/or the irradiation targets are retained in the instrumentation tube system by a magnetic lock.

11. The method according to claim 1 wherein the step of activating the irradiation targets comprises calculating an irradiation time and an axial irradiation position considering the actual state of the reactor including current neutron flux, fuel burn-up, reactor power and/or loading.

12. The method according to claim 11 wherein the actual state of the reactor is determined using information comprising at least one of the following: neutron flux from ex-core or in-core detectors, activation values from an existing ball measuring system, burn-up, reactor power, loading, rod positions flow rate, inlet-temperature, pressure and time synchronization.

13. The method according to claim 1 wherein the step of retrieving the irradiation targets and dummy targets comprises transferring the irradiation targets and dummy targets out of the instrumentation finger into a discharge tube using pressurized gas and preserving the linear order of the dummy targets and the irradiation targets.

14. The method according to claim 10 wherein the step of separating the irradiation targets from the dummy targets comprises selectively removing the irradiation targets from the instrumentation tube system by exposing the irradiation targets and the dummy targets to a magnet field, opening the magnetic lock, and releasing one of the irradiation targets or the dummy targets from the discharge tube while keeping the other one of the irradiation targets or the dummy targets in the discharge tube by the action of the magnetic field.

15. The method according to claim 9 wherein the step of separating the irradiation targets from the dummy targets comprises driving one of the dummy targets or the irradiation targets back into the instrumentation finger or a holding section in the irradiation tube system while retaining the other one of the dummy targets or the irradiation targets in the discharge tube through the magnetic field.

16. A radionuclide generation system comprising:
   an instrumentation tube system of a nuclear reactor including at least one instrumentation finger passing through a core of the nuclear reactor wherein the instrumentation tube system is configured to permit insertion and removal of irradiation targets and dummy targets into the instrumentation finger, and wherein the dummy targets and the irradiation targets have different magnetic properties;

a target drive system configured to insert the irradiation targets and dummy targets into the instrumentation finger in a predetermined linear order and to remove the irradiation targets and dummy targets from the instrumentation finger;

a core monitoring system and an instrumentation and control unit linked to each other and configured to calculate an optimum axial irradiation position and time for the irradiation targets based on the actual state of the nuclear reactor as provided by the core monitoring system;

a target removal system configured to retrieve the irradiation targets and dummy targets from the instrumentation tube system and separate the irradiation targets from the dummy targets, the target removal system including one or more magnets for exposing the dummy targets and/or the irradiation targets to a magnetic field to retain either the dummy targets or the irradiation targets in the instrumentation tube system and release the other one of the irradiation targets or the dummy targets from the instrumentation tube system.

17. The radionuclide generation system according to claim 16 wherein the instrumentation tube system is derived from a ball measuring system of a pressurized water reactor.

18. The radionuclide generation system according to claim 16 wherein the irradiation targets and the dummy targets have a round shape.

19. The radionuclide generation system according to claim 16 wherein the target drive system is pneumatically operated.

20. The radionuclide generation system according to claim 16 wherein the target drive system comprises a valve battery for separate control of transport of the irradiation targets and dummy targets in the instrumentation tube system.

21. The radionuclide generation system according to claim 16 wherein the one or more magnets exposing the dummy targets and/or the irradiation targets to a magnetic field are arranged at the instrumentation tube system.

22. The radionuclide generation system according to claim 21 wherein the one or more magnets are selected from a permanent magnet and a solenoid.

23. The radionuclide generation system according to claim 16 wherein the instrumentation tube system includes a discharge tube connected to the instrumentation finger configured to receive the irradiation targets and dummy targets removed from the instrumentation finger.

24. The radionuclide generation system according to claim 23 wherein the one or more magnets for exposing the dummy targets and/or the irradiation targets to a magnetic field are arranged at the discharge tube.

25. The radionuclide generation system according to claim 24 wherein the discharge tube is provided with a magnetic lock for blocking the irradiation targets and/or dummy targets flowing out of the discharge tube.

26. The radionuclide generation system according to claim 25 wherein the magnetic lock comprises a retainer for retaining the targets in the discharge tube.

27. The radionuclide generation system according to claim 25 wherein the magnetic field and/or the magnetic lock are remotely controlled by the instrumentation and control unit.

28. The radionuclide generation system according to claim 26 wherein the magnetic field and/or the magnetic lock are remotely controlled by the instrumentation and control unit.

* * * * *